(12) United States Patent
Wallén et al.

(10) Patent No.: US 9,007,940 B2
(45) Date of Patent: Apr. 14, 2015

(54) DETERMINING AND SELECTING LEVELS OF POWER REDUCTION FOR SIGNALS TO BE TRANSMITTED FROM A MOBILE COMMUNICATIONS DEVICE

(75) Inventors: Anders Wallén, Ystad (SE); Lars Sundström, Södra Sandby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 461 days.

(21) Appl. No.: 13/516,277

(22) PCT Filed: Dec. 22, 2009

(86) PCT No.: PCT/EP2009/067771
§ 371 (c)(1),
(2), (4) Date: Aug. 22, 2012

(87) PCT Pub. No.: WO2011/076258
PCT Pub. Date: Jun. 30, 2011

(65) Prior Publication Data
US 2013/0044619 A1     Feb. 21, 2013

(51) Int. Cl.
*H04W 52/26* (2009.01)
*H04W 52/52* (2009.01)

(52) U.S. Cl.
CPC ............ *H04W 52/262* (2013.01); *H04W 52/52* (2013.01); *Y02B 60/50* (2013.01)

(58) Field of Classification Search
USPC ..................... 370/252, 342; 455/69; 375/296
See application file for complete search history.

(56) References Cited

U.S. PATENT DOCUMENTS

| 2007/0155335 A1* | 7/2007 | Love et al. ...................... 455/69 |
| 2009/0052426 A1 | 2/2009 | Perraud |
| 2010/0150126 A1* | 6/2010 | Scholand et al. ............. 370/342 |

FOREIGN PATENT DOCUMENTS

| WO | 2008077540 A2 | 7/2008 |
| WO | 2008079454 A1 | 7/2008 |

(Continued)

OTHER PUBLICATIONS

3rd Generation Partnership Project, "Technical Specification Group Radio Access Network; User Equipment (UE) radio transmission and reception (FDD)," Technical Specification, 3GPP TS 25.101, Version 8.7.0, Release 8, May 2009, 3GPP, Valbonne, France, pp. 1-215.

(Continued)

*Primary Examiner* — Jung Park
*Assistant Examiner* — Chuong M Nguyen
(74) *Attorney, Agent, or Firm* — Coats & Bennett, PLLC

(57) ABSTRACT

Levels of power reduction for signals to be transmitted from a mobile communications device via radio channels in a digital wireless communications system, where each signal is modulated according to one of a number of modulation configurations, are determined. For each modulation configuration a first estimate of a power reduction is calculated (101), and the calculated first estimates are storied (102) in the device. The method comprises the steps of determining (103) a limited set of modulation configurations, said limited set comprising modulation configurations that have been determined likely to be used in practice; calculating (104) for each modulation configuration of the limited set an optimized estimate of a power reduction; and storing (105) the calculated optimized estimates in the device. In this way the power consumption of the device is reduced while keeping a look-up table at a reasonable size.

27 Claims, 4 Drawing Sheets

(56) References Cited

FOREIGN PATENT DOCUMENTS

| WO | WO 2008077540 A2 | * | 7/2008 | ............... H04B 1/04 |
| --- | --- | --- | --- | --- |
| WO | 2008130693 A2 | | 10/2008 | |
| WO | WO 2008130693 A2 | * | 10/2008 | ............ H04W 52/52 |
| WO | 2009015928 A1 | | 2/2009 | |
| WO | 2009048405 A1 | | 4/2009 | |

OTHER PUBLICATIONS

3rd Generation Partnership Project, "Dual-Cell HSUPA," 3rd Generation Partnership Project Work Item Description, RP-090014, Document for Approval, TSG-RAN Meeting #43, Nokia Siemens Networks, Biarritz, France, Mar. 3, 2009-Mar. 6, 2009, Agenda Item 13, pp. 1-6.

3rd Generation Partnership Project, "Technical Specification Group Radio Access Network; Multiplexing and channel coding (FDD)," Technical Specification, 3GPP TS 25.212, Version 8.5.0 Release 8, Mar. 2009, 3GPP, Valbonne, France, pp. 1-107.

3rd Generation Partnership Project, "Technical Specification Group Radio Access Network; Physical Layer Procedures (FDD)," Technical Specification, 3GPP TS 25.214 Version 8.6.0, May 2009, 3GPP, Valbonne, France, pp. 1-92.

3rd Generation Partnership Project, "Technical Specification Group Radio Access Network; Spreading and modulation (FDD)," Technical Specification, 3GPP TS 25.213 Version 8.4.0, Release 8, Mar. 2009, 3GPP, Valbonne, France, pp. 1-36.

* cited by examiner

DETERMINING AND SELECTING LEVELS OF POWER REDUCTION FOR SIGNALS TO BE TRANSMITTED FROM A MOBILE COMMUNICATIONS DEVICE

TECHNICAL FIELD

The embodiments according to the invention relate to determining and selecting levels of power reduction for signals to be transmitted from a mobile communications device via a number of radio channels in a digital wireless communications system, each of said signals being modulated according to one of a number of modulation configurations.

BACKGROUND

In cellular systems, energy consumption in the user equipment (UE) is one of the most important aspects to take into consideration when introducing new features and standards. Energy consumption is determined by many parameters, which differ between different standards, but the power amplifier (PA) is usually a very significant contributor, especially when the user equipment is operating at high output power.

The PA efficiency, i.e. the relation between the transmitted and the consumed power, can be made high by having the power amplifier operate in a non-linear region. This, however, has the side effect that energy is also emitted in other frequencies than the intended ones, thus causing interference to systems operating at these frequencies.

In order to reduce these unwanted out-of-band emissions, the power amplifier can be made less non-linear, i.e. more linear, by increasing the PA bias, but this again reduces the PA efficiency, and thus it may drastically deteriorate the UE power consumption. In several standards, it is instead allowed in some situations to reduce the maximum transmitted power from its nominal value. The need for this maximum power reduction (MPR) depends on the used signal waveform, which is determined by e.g. the modulation.

In WCDMA systems, cubic metric (CM) is typically used as a measure for how much MPR may be applied for a given waveform. A particular WCDMA uplink signal waveform consists of several components associated with different physical layer parameters such as spreading codes, spreading factors, power levels, and modulation, which all determine the cubic metric of the signal in a non-trivial way.

Cubic metric is a heuristic measure, with some numerical constants chosen so that the allowed MPR in dB can be calculated from the cubic metric for WCDMA uplink signals. The basic principle is that different waveforms should be able to fulfill the dimensioning out-of-band requirement (typically Adjacent Channel Leakage power Ratio—ACLR) using the same PA bias. However, it has been found that the MPR indicated by the calculated cubic metric is often over- or underestimated by a substantial amount, compared to what is really required for a particular waveform and a particular power amplifier.

Cubic metric is based on the relative amount of power for third order distortion. It does, however, not consider the distribution of this power in frequency domain, in particular not the distribution between in-band and adjacent channels. WCDMA uplink waveforms with the same cubic metric often have completely different distributions and thus the cubic metric-based MPR often fails.

WO 2008/077540 has introduced modulation profiles as the basis for significantly improved MPR estimation. Modulation profiles address the weaknesses of cubic metric. Rather than only quantifying the total third order distortion power, the channel distribution for third and higher order products are calculated for every waveform. Each such set of power levels originating from one waveform is referred to as a modulation profile. The modulation profiles can be mapped to MPR in many ways. In this document a simple linear combination of the modulation profile numbers given in dB was proven to give a sufficient accuracy. Thus with modulation profiles it is possible to easily and quickly calculate accurate MPR values for all waveforms and for different power amplifier characteristics. This enables the design of user equipment that can operate with significantly smaller margins on design parameters and therefore with much higher power efficiency.

As mentioned above, the required MPR depends on the parameters for the physical channels in a WCDMA signal. In TS 25.101, "User Equipment (UE) radio transmission and reception (FDD)", 3GPP, Release 8, some or all of the following uplink physical channels are used:
  DPCCH, which e.g. carries pilot symbols and power control commands;
  DPDCH, which carries data for the transport channel DCH;
  HS-DPCCH, which carries feedback information for an associated DL HS-DSCH transmission;
  E-DPDCH, which carries data for the transport channel E-DCH; and
  E-DPCCH, which carries control information for the associated E-DPCH channel(s).

The number of permissible combinations of parameters for these physical channels is very large, above 300 000 for a 3GPP Rel. 8 signal.

One problem in the existing WCDMA standard is that the cubic metric calculation is difficult to do on the fly. Instead, a natural solution is to calculate the cubic metric offline for all possible channel configurations, and store the corresponding allowed MPR in a look-up table. A drawback is that the look-up table needs to be very large, since the number of allowed configurations is more than 300000 in 3GPP Rel. 8. With the introduction of multi-carrier transmission, the issue becomes even bigger, since the number of combinations grows even more. Thus, any method that simplifies the MPR calculation would be beneficial.

Another problem is that the cubic metric often does not give an accurate measure of the MPR that is actually required to fulfill the out-of-band requirements. This may result in that the power amplifier bias, and hence the power consumption, must be set unnecessarily high.

When cubic metric-based MPR values are used the look-up table is kept relatively small despite the large number of entries. The reason is that the MPR based on cubic metric is specified as numbers rounded to nearest higher value on a 0.5 dB grid. Thus, only three bits per entry will be required to represent an MPR from the specified range from 0 to 3.5 dB. However, if a more accurate MPR should be used, possibly together with optimal power amplifier biasing, the size of the look-up table will increase dramatically.

Therefore, it is an object of embodiments of the invention to provide a method of determining levels of power reduction for signals transmitted from a mobile communications device that reduces the power consumption of the device while keeping the look-up tables at a reasonable size.

SUMMARY

According to embodiments of the invention the object is achieved in a method of determining levels of power reduction for signals to be transmitted from a mobile communications device via a number of radio channels in a digital wireless communications system, each of said signals being modulated according to one of a number of modulation configurations, the method comprising the step of calculating, for each modulation configuration, a first estimate of a power reduction to be used for transmission from the mobile communications device of signals modulated according to said modulation configuration; and storing the calculated first estimates in the mobile communications device. The method further comprises the steps of determining a limited set of modulation configurations, said limited set comprising modulation configurations that have been determined likely to be used in practice; calculating for each modulation configuration of the limited set an optimized estimate of a power reduction to be used for transmission of signals modulated according to said modulation configuration; and storing the calculated optimized estimates in the mobile communications device.

By determining a limited set of modulation configurations that are likely to be used in practice and calculating optimized estimates of the power reduction only for the configurations of the limited set, it is ensured that the size of the look-up table can be kept reasonable, because the first estimates calculated according to the standard occupies much less memory space than the optimized estimates.

Although the number of permissible combinations of parameters for all the types of physical channels is very large, above 300000 for a 3GPP Rel. 8 signal most of them will never—or very rarely—be used in practice. For example, for a signal with a given set of physical channels, the spreading codes and the spreading factors are set in accordance with the code rate and the amount of information that the physical channels are carrying. There is then a limited range of settings among the permissible ones for each physical channel that is reasonable to apply.

Thus the method optimizes the applied MPR with respect to a limited set of physical channel configurations that are determined likely to be used in practice. These optimized settings allow a better performance for the limited set of physical channel configurations. For signals not belonging to this set, one may instead use more conservative values of MPR.

The method may further comprise the step of calculating at least one of said first estimate and said optimized estimate from modulation dependent data comprising a term calculated from a third order product of a signal modulated according to said modulation configuration. This will typically be the case for the first estimates, which can then be calculated from the cubic metric according to the standard. Alternatively, the method may comprise the step of calculating at least one of said first estimate and said optimized estimate based on characteristics of the signal and a model of a transmitter of the mobile communications device.

The method may further comprise the step of calculating for each modulation configuration of the limited set an optimized set of transmitter settings for the mobile communications device. The set of transmitter settings may comprise at least one of a bias and a supply voltage for a power amplifier of the mobile communications device. Also the power settings of the transmitter influence the power consumption. With the limited set of modulation configurations there is also a limited range of power settings among the permissible ones for each physical channel that is reasonable to apply. Too low power setting will cause the data/control transmission to fail, and too high power setting will only be a waste of power, resulting in increased user equipment battery drain and increased interference level in the network. When the applied MPR as well as the transmitter settings are optimized for the limited set of physical channel configurations, user equipment energy consumption can be reduced for these configurations. For signals not belonging to this set, one may instead use more conservative values of the settings, such that the user equipment energy consumption may be considerably higher for these cases. However, since these signals presumably are used very rarely, this behavior will affect the overall user equipment battery drain only marginally. With the limited set of configurations, accurate MPR and transmitter settings can be stored efficiently in a small look-up table.

In one embodiment the method further comprises the steps of determining the limited set of modulation configurations from knowledge of system settings for a given network vendor or network operator; and calculating and storing said optimized estimates offline. The physical layer parameters to use, including the power settings, are to a large extent signaled to the user equipment by the network. These parameters are typically vendor specific, and it is also possible for the operators to fine-tune them to optimize them for a given deployment. However, the range of reasonable power settings is rather limited, and much smaller than what is allowed by the standard. In addition to the signaled parameters, the user equipment may adjust these parameters in certain situations, for example when subject to maximum output power constraints.

One way of obtaining these settings is when the method further comprises the steps of operating a specimen communications device at different data rates and different modulation configurations in different networks of said digital wireless communications system; recording measurement results during this operation; and obtaining said knowledge of system settings from the recorded measurement results.

In another embodiment the method further comprises the steps of receiving system parameters from a network of said digital wireless communications system during operation of the mobile communications device; determining the limited set of modulation configurations from the received system parameters in said mobile communications device; and calculating and storing said optimized estimates in said mobile communications device.

The method may further comprise the steps of recording during operation of said mobile communications device information about use of different modulation configurations; updating, if a current limited set of modulation configurations does not reflect the actual use of modulation configurations, the limited set accordingly; and calculating and storing optimized estimates for modulation configurations of the updated, limited set of modulation configurations. After the optimizations for the first preferred set have been performed, it is possible to continue updating the preferred set based on new signalling and/or observations of what configurations actually are being used. Thus, the look-up table or a part of the look-up table storing MPR and PA bias parameters can have a variable content.

In one embodiment the step of calculating optimal estimates for modulation configurations of the updated set may comprise the steps of generating in transmitter circuitry of said mobile communications device, in a time period where this circuitry is not used for transmitting other signals, a signal corresponding to a modulation configuration of the updated, limited set of modulation configurations; and calculating from the generated signal said optimized estimates for this modulation configuration.

In another embodiment the step of calculating optimal estimates for modulation configurations of the updated set may comprise the steps of requesting, when the limited set of modulation configurations has been updated, optimized estimates for a new modulation configuration of the set from a server containing a database with optimal estimates for all modulation configurations previously calculated for said mobile communications device; and receiving the requested estimates from said server and storing them in said mobile communications device.

In yet another embodiment the step of calculating optimal estimates for modulation configurations of the updated set may comprise the steps of transmitting signals modulated according to one of said modulation configurations from the mobile communications device; receiving said signals in a measurement receiver and determining from the received signals a spectral emission emitted from the mobile communications device during the transmission of the signals; and calculating from the determined spectral emission optimized estimates for that modulation configuration. The measurement receiver may be external to be used off-line, but it is also possible to incorporate the measurement receiver in the mobile communications device and use it on-line.

Some embodiments of the invention also relate to a method of selecting in a mobile communications device a level of power reduction for a signal to be transmitted from the mobile communications device via a number of radio channels in a digital wireless communications system, the signal being modulated according to one of a number of modulation configurations, the mobile communications device having stored in a memory thereof: first estimates of a power reduction to be used for transmission of signals from the mobile communications device, wherein a first estimate has been calculated for each of said modulation configurations; and optimized estimates of a power reduction to be used for transmission of signals from the mobile communications device, wherein an optimized estimate has been calculated for each modulation configuration of a limited set of modulation configurations, said limited set comprising modulation configurations that have been determined likely to be used in practice. The method comprises the steps of determining a modulation configuration to be used for modulation of the signal in a subsequent period of time; determining whether said determined modulation configuration belongs to the limited set of modulation configurations; using, if the determined modulation configuration belongs to the limited set of modulation configurations, the stored optimized estimate for transmission of the signal; and using otherwise the stored first estimate for transmission of the signal.

Embodiments corresponding to those mentioned above for the method of determining levels of power reduction also apply for the method of selecting a level of power reduction.

Some embodiments of the invention also relate to a mobile communications device configured to transmit signals via a number of radio channels in a digital wireless communications system and to modulate transmitted signals according to one of a number of modulation configurations, the device further being configured to use a level of power reduction for a signal to be transmitted from a mobile communications device, the device comprising a memory having stored therein first estimates of a power reduction to be used for transmission of signals from the mobile communications device, wherein a first estimate has been calculated for each of said modulation configurations; and optimized estimates of a power reduction to be used for transmission of signals from the mobile communications device, wherein an optimized estimate has been calculated for each modulation configuration of a limited set of modulation configurations, said limited set comprising modulation configurations that have been determined likely to be used in practice. The device is further configured to determine a modulation configuration to be used for modulation of the signal in a subsequent period of time; determine whether said determined modulation configuration belongs to the limited set of modulation configurations; use, if the determined modulation configuration belongs to the limited set of modulation configurations, the stored optimized estimate for transmission of the signal; and use otherwise the stored first estimate for transmission of the signal.

Embodiments corresponding to those mentioned above for the method of selecting a level of power reduction also apply for the mobile communications device.

BRIEF DESCRIPTION OF THE DRAWINGS

Embodiments of the invention will now be described more fully below with reference to the drawings, in which.

DETAILED DESCRIPTION OF EMBODIMENTS

Figure 1:
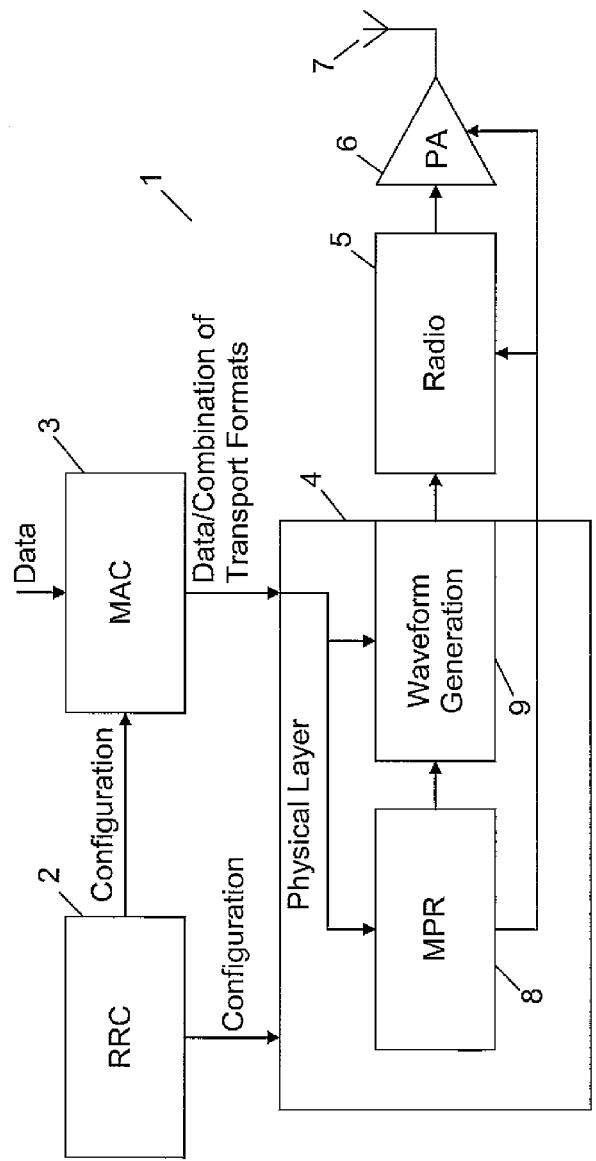
FIG. 1 shows a simple block diagram of a transmitter in a mobile terminal.

In FIG. 1 a simple block diagram of a transmitting chain 1 in a mobile terminal is shown. The mobile terminal may be adapted for use in e.g. a Code Division Multiple Access (CDMA) system or a Wideband Code Division Multiple Access (WCDMA) system according to the 3GPP standard and arranged to handle some or all of the following uplink physical channels:

DPCCH, which e.g. carries pilot symbols and power control commands;

DPDCH, which carries data for the transport channel DCH;

HS-DPCCH, which carries feedback information for an associated DL HS-DSCH transmission;

E-DPDCH, which carries data for the transport channel E-DCH; and

E-DPCCH, which carries control information for the associated E-DPCH channel(s).

The specification for these physical channels allows more than 300 000 different configurations of signal modulation to be used by the transmitter of the mobile terminal.

Five blocks are shown, radio resource control RRC 2, medium access control MAC 3, physical layer 4, Radio 5 and the Power Amplifier PA 6. In the RRC block 2, channels are configured based on control messages from the network. In this configuration of channels all possible transport format combinations are given as well as the configuration of each physical channel. The MAC block 3 is handling the data which are to be transmitted on each of the channels. MAC schedules the amount of data which shall be transmitted on each of the channels. In the physical layer 4 the multiplexing of data on the physical channels is performed, the channels are modulated and combined in the waveform generator 9.

The resulting signals are then handled by the radio circuit 5 and amplified in the power amplifier 6 for transmission via the antenna(s) 7.

As mentioned, the transmitter 1 of the mobile terminal may be required to handle more than 300 000 different configurations of signal modulation, each of which has its own unique properties, e.g. with respect to the peak-to-average ratio of the signal. If the root-mean-square (RMS) level of signals is kept constant, signals with different peak-to-average ratio will cause different levels of distortion in a nonlinear circuit, such as the power amplifier 6. Since such distortion affects leakage to adjacent channels, also the Adjacent Channel Leakage power Ratio (ACLR), defined as the ratio of a filtered mean power centered on the assigned channel frequency to a filtered mean power centered on an adjacent channel frequency, will be different for each modulation configuration.

To reduce the consequences of this effect, the output power of the power amplifier 6 may be reduced from the nominal maximum output power to a lower value in dependence of the modulation configuration used with the aim of approximately equalizing the ACLR for all modulation configurations. This power reduction is also referred to as back-off. The 3GPP standard includes a maximum allowed level of the power reduction, i.e. a Maximum Power Reduction (MPR).

The power reduction can be determined in the MPR unit 8 based on the input from RRC 2 and MAC 3, and this limits the maximum output power transmitted from the terminal. The calculated back-off is used in the waveform generation 9 when transmitting the signal. The MPR calculations may also be used to control the radio block 5 and the power amplifier 6 as it will be described below.

As mentioned above, in WCDMA systems, cubic metric (CM) is typically used as a measure for how much MPR may be applied for a given waveform. A particular WCDMA uplink signal waveform consists of several components associated with different physical layer parameters such as spreading codes, spreading factors, power levels, and modulation, which all determine the cubic metric of the signal in a non-trivial way.

Cubic metric is a heuristic measure, with some numerical constants chosen so that the allowed MPR in dB can be calculated from the cubic metric for WCDMA uplink signals. The basic principle is that different waveforms should be able to fulfill the dimensioning out-of-band requirement (typically Adjacent Channel Leakage power Ratio—ACLR) using the same PA bias. However, it has been found that the MPR indicated by the calculated cubic metric is often over- or underestimated by a substantial amount, compared to what is really required for a particular waveform and a particular power amplifier.

Cubic metric is based on the relative amount of power for third order distortion. It does, however, not consider the distribution of this power in frequency domain, in particular not the distribution between in-band and adjacent channels. WCDMA uplink waveforms with the same cubic metric often have completely different distributions and thus the cubic metric-based MPR often fails.

WO 2008/077540 has introduced modulation profiles as the basis for significantly improved MPR estimation. Modulation profiles address the weaknesses of cubic metric. Rather than only quantifying the total third order distortion power, the channel distribution for third and higher order products is calculated for every waveform. Each such set of power levels originating from one waveform is referred to as a modulation profile. The modulation profiles can be mapped to MPR in many ways. In this document a simple linear combination of the modulation profile numbers given in dB was proven to give a sufficient accuracy. Thus with modulation profiles it is possible to easily and quickly calculate accurate MPR values for all waveforms and for different power amplifier characteristics. This enables the design of user equipment that can operate with significantly smaller margins on design parameters and therefore with much higher power efficiency.

In the existing WCDMA standard the cubic metric calculation is difficult to do on the fly. Instead, a natural solution is to calculate the cubic metric offline for all possible channel configurations, and store the corresponding allowed MPR in a look-up table. A drawback is that the look-up table needs to be very large, since the number of allowed configurations may be more than 300000. With the introduction of multi-carrier transmission, the issue becomes even bigger, since the number of combinations grows even more.

Further, the cubic metric often does not give an accurate measure of the MPR that is actually required to fulfill the out-of-band requirements. This may result in that the power amplifier bias, and hence the power consumption, must be set unnecessarily high.

Although a large number of entries in the look-up table are needed, when cubic metric-based MPR values are used, the look-up table can still be kept relatively small. The reason is that the CM-based MPR is specified as numbers rounded to nearest higher value on a 0.5 dB grid. Thus, only three bits per entry will be required to represent an MPR from the specified range from 0 to 3.5 dB. However, if a more accurate MPR should be used, possibly together with optimal power amplifier biasing, the size of the look-up table will increase dramatically.

As mentioned, the number of permissible combinations of parameters for all the above types of physical channels is very large, above 300000 for a 3GPP Rel. 8 signal. However, most of them will never—or very rarely—be used in practice. For example, for a signal with a given set of physical channels, the spreading codes and the spreading factors are set in accordance with the code rate and the amount of information that the physical channels are carrying. There is then a limited range of power settings among the permissible ones for each physical channel that is reasonable to apply. Too low power setting will cause the data/control transmission to fail, and too high power setting will only be a waste of power, resulting in increased UE battery drain and increased interference level in the network.

In an embodiment of the present invention a method is provided to optimize the applied MPR and possibly also the applied transmitter settings, such as PA bias settings with respect to a limited set of physical channel configurations that are determined likely to be used in practice. These optimized settings are intended to minimize the energy consumption of the user equipment. For signals not belonging to this set, one may instead use more conservative values of MPR and/or PA bias settings, such that the energy consumption of the user equipment may be considerably higher for these cases. However, since these signals presumably are used very rarely, this behavior will affect the overall user equipment battery drain only marginally. With the limited set of configurations, accurate MPR and PA biasing parameters can be stored efficiently in a small look-up table.

Figure 2:
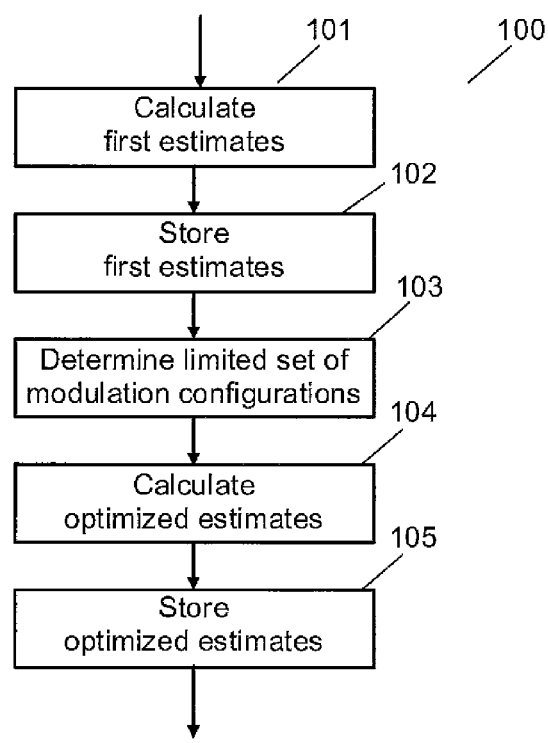
FIG. 2 shows a flowchart illustrating how the first and the optimized estimates can be calculated and stored.

A flowchart 100 illustrating how the standardized and the optimized MPR estimates can be calculated and stored is shown in FIG. 2. First, in step 101, a first estimate of the MPR is calculated for each of the above 300000 modulation configurations according to the standard, e.g. based on the cubic metric. It is noted that the term "modulation configuration" could here also be read as "physical channel configuration", i.e. it is more than just a modulation format or a set of constellation points; it includes the whole chain from bits to time signal, including e.g. spreading, pulse-shaping, and how to weight and combine the physical channels. The calculated estimates are then stored in the user equipment in step 102. In step 103 a limited set of modulation configurations most likely to be used in practice is then determined. There are several ways of determining this set, which will be described in detail below.

Having determined the limited set, an optimized estimate of the MPR is then calculated for each configuration of the limited set in step 104. As an example, the optimized estimates can be calculated using modulation profiles as described above. Finally, these optimized estimates are then stored in the user equipment in step 105. Naturally, the first estimates as well as the optimized estimates may also be calculated first and then stored together in the user equipment in one single storing step. This could be the case when the estimates are calculated during the development phase of a new model of user equipment and then subsequently stored in each device during the production phase.

In order to reduce the amount of required memory in the device, it is possible to calculate and store only sub-optimal estimates of the MPR in step 102. These values need to be less than or equal to the maximum allowed MPR defined by the regulatory requirements. As a consequence, the PA bias may have to be increased in order not to violate emission requirements such as the ACLR. In an extreme case, the first estimates allow for no MPR at all for any physical channel configuration, and the PA bias could be set sufficiently high to ensure ACLR fulfillment for all signals. Such an approach would increase the power consumption in the device substantially, if the optimization for the limited set is not done properly in steps 103-105.

In addition to the optimized estimate of the MPR calculated for each configuration of the limited set, an optimized set of transmitter settings may also be calculated for these configurations. These optimized settings may include at least one of the bias and the supply voltage of the power amplifier.

The physical layer parameters to use, including the power settings, are to a large extent signaled to the user equipment by the network. These parameters are typically vendor specific, and it is also possible for the operators to fine-tune them to optimize them for a given deployment. However, the range of reasonable power settings is rather limited, and much smaller than what is allowed by the standard. In addition to the signaled parameters, the user equipment may adjust these parameters in certain situations, for example when subject to maximum output power constraints.

Thus the present invention is a method to optimize the applied MPR and the applied PA bias with respect to a limited set of physical channel configurations—in the following referred to as the preferred set or preferred configurations—that are likely to be used in practice.

Figure 3:
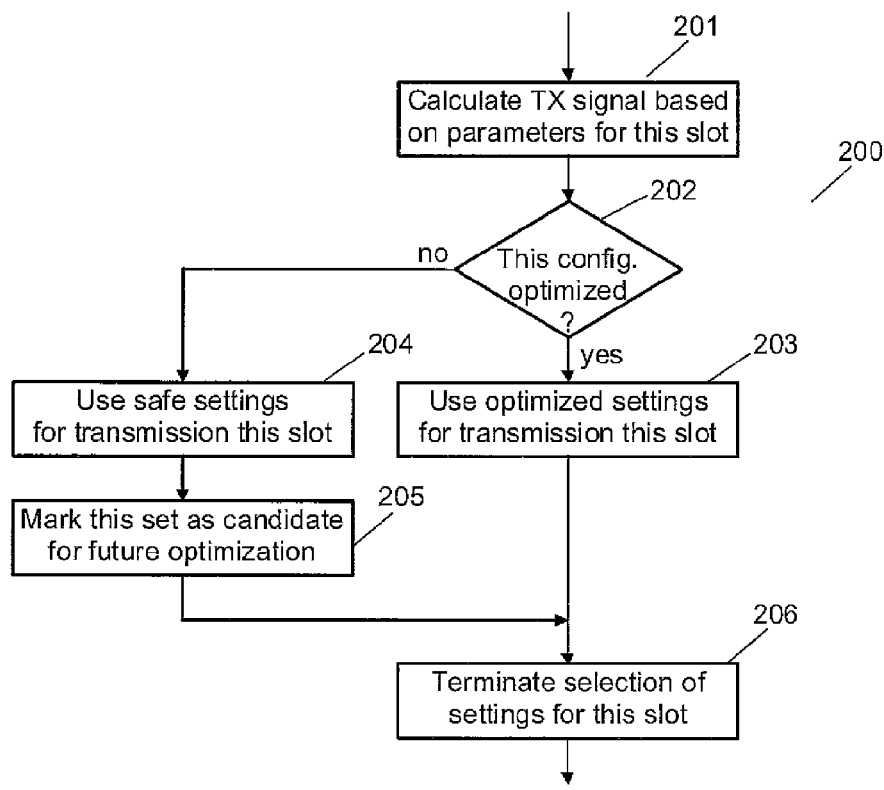
FIG. 3 shows a flowchart illustrating a mode of operation for an uplink transmitter configured to select between the first and the optimized estimates.

The basic mode of operation for an uplink WCDMA transmitter employing some embodiments according to the invention is depicted in the flowchart 200 in FIG. 3. Each slot, the signal to transmit is created in step 201 according to the currently chosen configuration with its set of physical layer parameters, i.e. beta (gain) factors, spreading factors, spreading codes, and modulation. Then in step 202 it is checked whether this configuration belongs to the preferred set, i.e. whether optimized MPR and PA bias values have been calculated for this configuration.

If this configuration belongs to the preferred set—i.e. optimized MPR and PA bias values has been stored in the user equipment for this configuration—the corresponding optimal settings are used in step 203. These optimal values are intended to minimize the energy consumption of the user equipment, while still fulfilling the 3GPP requirements with reasonable margin.

For signals not belonging to the preferred set, one may use more conservative values of MPR and/or PA bias settings, in step 204, such that the energy consumption of the user equipment will be considerably higher for these cases. However, since these signals presumably are used very rarely, this behavior will affect the overall user equipment battery drain only marginally. If this step has been performed, one of the rarely used configurations has actually been used, and therefore this configuration may be marked and stored in step 205 as a candidate for future optimization in the case where the preferred set of configurations may be modified in the user equipment.

Figure 4:
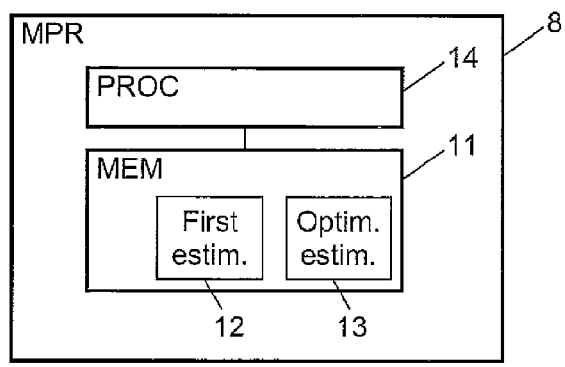
FIG. 4 shows an MPR unit with a memory in which the first estimates as well as the optimized estimates are stored.

Thus, as shown in FIG. 4, the MPR unit 8 comprises a memory 11 in which the first estimates 12 of the MPR and sometimes transmitter settings as well as the optimized estimates 13 of the MPR and transmitter settings are stored. A processor 14 checks whether a current configuration belongs to the preferred set or not, and accordingly it selects the corresponding estimate from either the optimized or the first estimates as described above.

Figure 5:
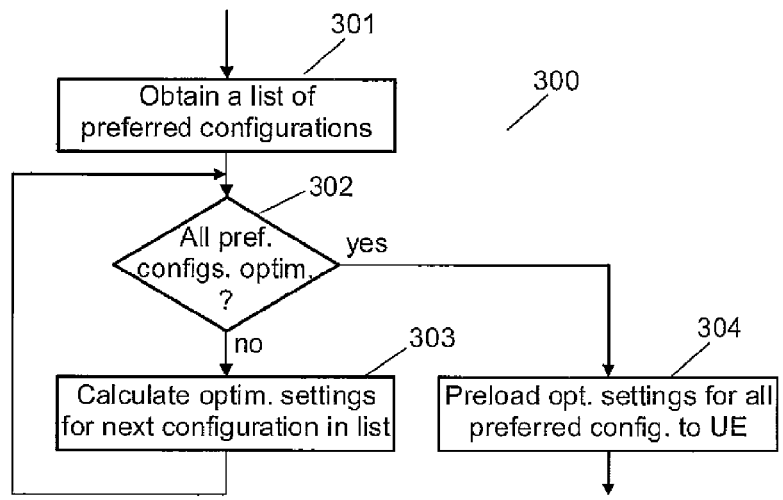
FIG. 5 shows a flowchart illustrating one way of determining the limited set of configurations through knowledge of system settings for a network vendor and/or an operator.

One way of determining the first preferred set of configurations is through knowledge of system settings for one or more network vendors and/or one or more operators. Optimal MPR values and/or PA bias settings (or other transmitter settings) for the preferred set can then be obtained off-line, potentially taking detailed knowledge of particular PA characteristics into account. The settings can then be preloaded to the user equipment. A procedure following this scheme is depicted in the flowchart 300 shown in FIG. 5. First, in step 301, a list of preferred configurations is obtained e.g. from a network vendor, and then optimal settings for these configurations are calculated. In step 302 it is checked if all configurations of the set have been optimized. If not, optimized values for the next configuration in the list are calculated in step 303. When optimized settings have been calculated for all configurations of the preferred set the calculated values can be stored or preloaded in the user equipment in step 304.

In practice, first-hand information of what system settings different vendors/operators use may not be available. One way then of obtaining such information would be to have test user equipments operate in various networks at a wide variety of data rates, and record the usage of different configurations.

Figure 6:
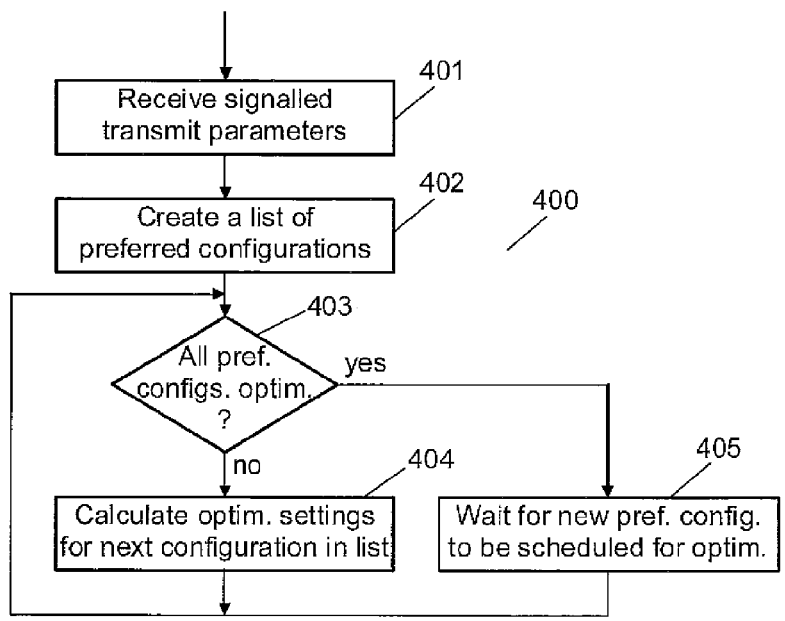
FIG. 6 shows a flowchart illustrating how the limited set can be constructed after receiving system parameters transmitted by the network.

In other embodiments of the invention, the preferred set does not need to be preloaded to the user equipment. One such procedure is depicted in the flowchart 400 shown in FIG. 6. Instead, the preferred set can be constructed after receiving system parameters transmitted by the network, from which the preferred set can be derived, and subsequently the corresponding MPR and PA bias optimization can be performed. In step 401, signaled transmit parameters are received from the network, and based on these parameters a list of preferred configurations is then created in step 402. The optimal settings for these configurations can then be calculated. In step 403 it is checked if all configurations of the set have been optimized. If not, optimized values for the next configuration in the list are calculated in step 404.

Furthermore, after the optimizations for the first preferred set have been performed, it is possible to continue updating the preferred set based on new signaling and/or observations of what configurations actually are being used. Therefore, when optimized settings have been calculated for all configurations of the preferred set the process enters a wait state in step 405 until new preferred configurations are scheduled for optimization. Thus, the look-up table or a part of the look-up table storing MPR and PA bias parameters can have a variable content.

In WCDMA, the system settings that are required to calculate a first preferred set include a number of parameters that are sent through RRC (Radio Resource Control) signaling from the network to the user equipment. This signaling is done on a slow time-scale, mostly during connection set-up phases. Thus, most of these parameters typically do not change over time during the connection. From the signaled parameters, the user equipment may deduct, directly or through calculations, what physical channel configurations to use depending on the number of information bits to be transmitted. The procedure for retrieving the used channel configurations is described in 3GPP Technical Specifications, e.g. Sec. 4.8.4.1 of TS 25.212, "Multiplexing and channel coding (FDD)", 3GPP, Sec. 4.2.1 of TS 25.213, "Spreading and modulation (FDD)", 3GPP and Sec 5.1.2.5-5.1.2.5B of TS 25.214, "Physical layer procedures (FDD)", 3GPP.

The update procedure can be implemented in several ways. For example, parts of the transmitter chain can be used during times when it is actually not used for transmitting any signal. A signal corresponding to a new preferred configuration can be generated in the digital parts of the transmitter chain, whereupon relevant measures such as the cubic metric or preferably modulation profiles can be calculated, and optimized MPR and PA bias settings can be determined and stored for this configuration. Note that there are no strict timing requirements associated with these calculations, and they can be carried out anytime when the transmitter chain is idle.

Another proposal for the update procedure is to invoke a server that contains a database for all configurations and possibly specific for different models of user equipment or models of parts (power amplifiers, TX chips etc) within the user equipment. The user equipment may access such a service when previously unused or seldom used configurations are logged as being used frequently. The user equipment may also access such a service on a regular basis. In the latter case the user equipment may inquire for general updates if the UE manufacturer has identified a need to alter the parameters.

The update procedure can also involve the use of a measurement receiver with the purpose of carefully improving PA biasing further that in turn may change the MPR too. This is motivated by the fact that the characteristics of TX chain parts like the power amplifier will differ from the nominal behavior that must otherwise have to be assumed. Also, aging and environmental parameters may influence the characteristics. More specifically, a measurement receiver would be used to quantify spectral emission (e.g. ACLR) during normal operation, record the results associated with the particular configuration in use, apply an optimization algorithm to tune PA biasing and/or MPR slightly for that same configuration when used the next time. The algorithm should optimize the parameters to reach/maintain a desired level of margin in terms of ACLR while maximizing the power efficiency. The measurement receiver may be external to be used off-line, but it is also possible to incorporate the measurement receiver in the mobile communications device and use it on-line.

Existing user equipment implementations may have PA biasing dependent on output power to ensure that the power amplifier is operated efficiently at all levels. This technique may be combined with embodiments of the present invention. Rather than having a single table of PA bias points as a function of output power a vector of such tables should be available where each preferred configuration points to the most suitable table. In this way a low memory usage may be maintained. The disadvantage is that the bias points cannot be tuned as discussed above based on one configuration as a bias point may be addressed by several configurations.

If the ability to tune biasing on a per-configuration basis is still desired each such configuration should have its own bias point vs. output power table. This enables further optimization of each configuration at the expense of increased memory usage. As an alternative to storing actual bias point values in the table the table may instead contain indices to a common list of predefined bias point settings. Thus, when a bias point for a specific configuration and output power level should be altered the corresponding index is changed to that bias point that best resembles the desired bias point.

In many cases the number of bits required specifying a bias point is large but the common list of available bias points can be limited in size (a small subset of all possible combinations). If this is the case using a table with indices to a common bias point settings list for each preferred configuration will be very efficient with respect to memory allocation.

Common for all update and tuning procedures described above is that results produced should be checked for compliance with standard specifications. For example, if an MPR value is calculated for a given configuration it should be checked that it is not any higher than the allowed MPR for that configuration. If that is the case the MPR valued stipulated by the standard should be used.

Although embodiments according to the invention primarily have been described with respect to WCDMA signals, it may advantageously be applied to other technologies as well. This includes for example extensions to the current WCDMA standard, such as operation over multiple carriers.

The methods described above allow for more power efficient operation of user equipment while it is only required to store detailed MPR and PA biasing values for a limited set of configurations thereby significantly reducing memory requirements. They also cater for flexibility with respect to the limited amount of configurations that can be supported by introducing update mechanisms that can store parameters for new frequently used configurations at the cost of scrapping less used configurations. This update mechanism can also be used for further refinement of parameters that may be user equipment specific. They can be combined with the capability to have PA bias points varying with output power.

Although various embodiments of the present invention have been described and shown, the invention is not restricted thereto, but may also be embodied in other ways within the scope of the subject-matter defined in the following claims.

The invention claimed is:

1. A method of determining levels of power reduction for signals to be transmitted from a mobile communications device via a number of radio channels in a digital wireless communications system, each of the signals being modulated according to one of a number of modulation configurations, the method comprising:
   calculating, for each modulation configuration, a first estimate of a power reduction to be used for transmission from the mobile communications device of signals modulated according to the modulation configuration;
   storing the calculated first estimates in the mobile communications device;
   determining a limited set of modulation configurations, the limited set comprising modulation configurations that have been determined likely to be used in practice;
   calculating, for each modulation configuration of the limited set, an optimized estimate of a power reduction to be used for transmission of signals modulated according to the corresponding modulation configuration;

storing the calculated optimized estimates in the mobile communications device;

wherein, for a corresponding modulation configuration, at least one of the calculating the first estimate and the calculating the optimized estimate comprises calculating based on characteristics of the signal and a model of a transmitter of the mobile communications device.

2. The method of claim 1 wherein, for a corresponding modulation configuration, at least one of the calculating the first estimate and the calculating the optimized estimate comprises calculating from modulation dependent data comprising a term calculated from a third order product of a signal modulated according to the corresponding modulation configuration.

3. The method of claim 1 further comprising calculating, for each modulation configuration of the limited set, an optimized set of transmitter settings for the mobile communications device.

4. The method of claim 3 wherein the set of transmitter settings comprises at least one of a bias and a supply voltage for a power amplifier of the mobile communications device.

5. The method of claim 1 further comprising:
determining the limited set of modulation configurations from knowledge of system settings for a given network vendor or network operator;
calculating and storing the optimized estimates offline.

6. The method of claim 5 further comprising:
operating a specimen communications device at different data rates and different modulation configurations in different networks of the digital wireless communications system;
recording measurement results during the operating;
obtaining the knowledge of system settings from the recorded measurement results.

7. The method of claim 1 further comprising:
receiving system parameters from a network of the digital wireless communications system during operation of the mobile communications device;
determining the limited set of modulation configurations from the received system parameters in the mobile communications device;
wherein the calculating and the storing of the optimized estimates occurs in the mobile communications device.

8. The method of claim 1 further comprising:
recording information about use of different modulation configurations during operation of the mobile communications device;
updating the limited set if a current limited set of modulation configurations does not reflect the actual use of modulation configurations;
calculating and storing optimized estimates for modulation configurations of the updated limited set of modulation configurations.

9. The method of claim 8 wherein the calculating optimized estimates for modulation configurations of the updated set comprises:
generating, in transmitter circuitry of the mobile communications device and in a time period where the transmitter circuitry is not used for transmitting other signals, a signal corresponding to a modulation configuration of the updated limited set of modulation configurations;
calculating the optimized estimates for the corresponding modulation configuration from the generated signal.

10. The method of claim 8 wherein the calculating optimized estimates for modulation configurations of the updated set comprises:

requesting, in response to the limited set of modulation configurations being updated, optimized estimates for a new modulation configuration of the set from a server containing a database with optimized estimates for all modulation configurations previously calculated for the mobile communications device;
receiving the requested estimates from the server and storing them in the mobile communications device.

11. The method of claim 8 wherein the calculating optimized estimates for modulation configurations of the updated set comprises:
transmitting signals modulated according to one of the modulation configurations from the mobile communications device;
receiving the signals in a measurement receiver and determining from the received signals a spectral emission emitted from the mobile communications device during the transmission of the signals;
calculating optimized estimates for that modulation configuration from the determined spectral emission.

12. A method of selecting, in a mobile communications device, a level of power reduction for a signal to be transmitted from the mobile communications device via a number of radio channels in a digital wireless communications system, the signal being modulated according to one of a number of modulation configurations, the mobile communications device having stored in a memory thereof:
first estimates of a power reduction to be used for transmission of signals from the mobile communications device, wherein a first estimate has been calculated for each of the modulation configurations;
optimized estimates of a power reduction to be used for transmission of signals from the mobile communications device, wherein an optimized estimate has been calculated for each modulation configuration of a limited set of modulation configurations, the limited set comprising modulation configurations that have been determined likely to be used in practice;
the method comprising:
determining a modulation configuration to be used for modulation of the signal in a subsequent period of time;
determining whether the determined modulation configuration belongs to the limited set of modulation configurations;
using, if the determined modulation configuration belongs to the limited set of modulation configurations, the stored optimized estimate for transmission of the signal, and otherwise using the stored first estimate for transmission of the signal;
wherein, for a corresponding modulation configuration, at least one of the first estimate and the optimized estimate has been calculated based on characteristics of the signal and a model of a transmitter of the mobile communications device.

13. The method of claim 12 wherein the mobile communications device has further stored in its memory, for each modulation configuration of the limited set, an optimized set of transmitter settings for the mobile communications device; wherein the method further comprises:
using, if the determined modulation configuration belongs to the limited set of modulation configurations, the stored optimized transmitter settings for transmission of the signal.

14. The method of claim 13 wherein the set of transmitter settings comprises at least one of a bias and a supply voltage for a power amplifier of the mobile communications device.

15. The method of claim 12 further comprising:
receiving system parameters from a network of the digital wireless communications system during operation of the mobile communications device;
determining the limited set of modulation configurations from the received system parameters in the mobile communications device;
calculating and storing the optimized estimates in the mobile communications device.

16. The method of claim 12 further comprising:
recording information about use of different modulation configurations during operation of the mobile communications device;
updating the actual use of modulation configurations if a current limited set of modulation configurations does not reflect the limited set;
calculating and storing optimized estimates for modulation configurations of the updated limited set of modulation configurations.

17. The method of claim 16 wherein the calculating optimized estimates for modulation configurations of the updated set comprises:
generating, in transmitter circuitry of the mobile communications device and in a time period where the transmitter circuitry is not used for transmitting other signals, a signal corresponding to a modulation configuration of the updated, limited set of modulation configurations;
calculating the optimized estimates for the corresponding modulation configuration from the generated signal.

18. The method of claim 16 wherein the calculating optimized estimates for modulation configurations of the updated set comprises:
requesting, in response to the limited set of modulation configurations being updated, optimized estimates for a new modulation configuration of the set from a server containing a database with optimized estimates for all modulation configurations previously calculated for the mobile communications device;
receiving the requested estimates from the server and storing them in the mobile communications device.

19. The method of claim 16 wherein the calculating optimized estimates for modulation configurations of the updated set comprises:
transmitting signals modulated according to one of the modulation configurations from the mobile communications device;
receiving the signals in a measurement receiver and determining from the received signals a spectral emission emitted from the mobile communications device during the transmission of the signals;
calculating from the determined spectral emission optimized estimates for that modulation configuration.

20. A mobile communications device configured to transmit signals via a number of radio channels in a digital wireless communications system and to modulate transmitted signals according to one of a number of modulation configurations, the device further being configured to use a level of power reduction for a signal to be transmitted from a mobile communications device, the device comprising:
memory having stored therein:
first estimates of a power reduction to be used for transmission of signals from the mobile communications device, wherein a first estimate has been calculated for each of the modulation configurations;
optimized estimates of a power reduction to be used for transmission of signals from the mobile communications device, wherein an optimized estimate has been calculated for each modulation configuration of a limited set of modulation configurations, the limited set comprising modulation configurations that have been determined likely to be used in practice;
a processor operatively connected to the memory and configured to:
determine a modulation configuration to be used for modulation of the signal in a subsequent period of time;
determine whether the determined modulation configuration belongs to the limited set of modulation configurations;
to cause use of the stored optimized estimate for transmission of the signal if the determined modulation configuration belongs to the limited set of modulation configurations, otherwise use of the stored first estimate for transmission of the signal;
wherein, for a corresponding modulation configuration, at least one of the first estimate and the optimized estimate has been calculated based on characteristics of the signal and a model of a transmitter of the mobile communications device.

21. The device of claim 20:
wherein the memory further has stored therein, for each modulation configuration of the limited set, an optimized set of transmitter settings for the mobile communications device;
wherein the processor is configured to cause use of the stored optimized transmitter settings for transmission of the signal if the determined modulation configuration belongs to the limited set of modulation configurations.

22. The device of claim 21 wherein the set of transmitter settings comprises at least one of a bias and a supply voltage for a power amplifier of the mobile communications device.

23. The device of claim 20 wherein the device is configured to:
receive system parameters from a network of the digital wireless communications system during operation of the mobile communications device;
determine the limited set of modulation configurations from the received system parameters;
calculate and store the optimized estimates.

24. The device of claim 20 wherein the device is configured to:
record information about use of different modulation configurations during operation of the mobile communications device;
update the limited set if a current limited set of modulation configurations does not reflect the actual use of modulation configurations;
calculate and store optimized estimates for modulation configurations of the updated limited set of modulation configurations.

25. The device of claim 24 wherein the device is configured to:
generate, in transmitter circuitry of the mobile communications device and in a time period where the transmitter circuitry is not used for transmitting other signals, a signal corresponding to a modulation configuration of the updated limited set of modulation configurations;
calculate the optimized estimates for the corresponding modulation configuration from the generated signal.

26. The device of claim 24 wherein the device is configured to:
request, in response to the limited set of modulation configurations being updated, optimized estimates for a new modulation configuration of the set from a server containing a database with optimal estimates for all modulation configurations previously calculated for the mobile communications device;

receive the requested estimates from the server and store them in the mobile communications device.

27. The device of claim 24 wherein the device is configured to:

transmit signals modulated according to one of the modulation configurations;

receive the signals in a measurement receiver and determine from the received signals a spectral emission emitted from the device during the transmission of the signals;

calculate from the determined spectral emission optimized estimates for that modulation configuration.

* * * * *